United States Patent
Willey

(10) Patent No.: US 7,925,280 B2
(45) Date of Patent: Apr. 12, 2011

(54) METHOD, AND ASSOCIATED APPARATUS, OF INTEGRATING EXTRACTION OF EXTRA PARTIAL IDENTITY BITS WITH QUICK PAGING TECHNIQUES WHERE MULTIPLE PAGES SHARE A MESSAGE FIELD

(75) Inventor: William Daniel Willey, Gilroy, CA (US)

(73) Assignee: Research In Motion Limited, Waterloo (CA)

( * ) Notice: Subject to any disclaimer, the term of this patent is extended or adjusted under 35 U.S.C. 154(b) by 873 days.

(21) Appl. No.: 11/850,484

(22) Filed: Sep. 5, 2007

(65) Prior Publication Data

US 2008/0057984 A1    Mar. 6, 2008

Related U.S. Application Data

(60) Provisional application No. 60/842,593, filed on Sep. 5, 2006.

(51) Int. Cl.
*H04W 68/00* (2009.01)

(52) U.S. Cl. ............... 455/458; 455/418; 455/422.1; 455/550.1; 370/338; 370/392; 370/393; 370/470; 370/476

(58) Field of Classification Search ............ 455/458, 455/418, 550.1; 370/338, 392, 393, 470, 370/474, 471
See application file for complete search history.

(56) References Cited

U.S. PATENT DOCUMENTS

| 6,072,987 | A * | 6/2000 | Willey | 340/7.43 |
| 2005/0064880 | A1 * | 3/2005 | Butler et al. | 455/458 |
| 2006/0285485 | A1 * | 12/2006 | Agrawal et al. | 370/208 |

OTHER PUBLICATIONS

Motorola: "Quick Paging Optimization—Falsing Reduction", 3GPP2 Meeting Contributions, WG2, [Online] No. 3GPP2-C22-20060825-003, Aug. 25, 2006, XP002479260.
Motorola, Rim, Huawei, Ritt & Zte: "Quick Paging Optimization & Performance Analysis" 3GPP2 Meeting Contributions, WG2, [Online] No. 3GPP2-C21-20060911-016, Sep. 11, 2006, XP002479261.

* cited by examiner

*Primary Examiner* — Kent Chang
*Assistant Examiner* — Magdi Elhag

(57) ABSTRACT

Apparatus, and an associated method, for facilitating paging of an access terminal. A detector detects delivery at the access terminal of a paging message. The paging message includes a group of identities that are ordered. The ordering is determinative of an extra identity bit conveyed with the paging message.

18 Claims, 10 Drawing Sheets

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 0 000 | A | B | C | D | E | F | G | H | I | J | K | L | M | N | O | P | Q | R | S | T | U | V | W | X | Y | Z | a | b | c | d | e | f |
| 1 001 | A | B | C | D | E | F | G | H | I | J | K | L | M | N | O | P | Q | R | S | T | U | V | W | X | Y | Z | a | b | c | d | e | f |
| 2 010 | A | B | C | D | E | F | G | H | I | J | K | L | M | N | O | P | Q | R | S | T | U | V | W | X | Y | Z | a | b | c | d | e | f |
| 3 011 | A | B | C | D | E | F | G | H | I | J | K | L | M | N | O | P | Q | R | S | T | U | V | W | X | Y | Z | a | b | c | d |
| 4 100 | A | B | C | D | E | F | G | H | I | J | K | L | M | N | O | P | Q | R | S | T | U | V | W | X | Y | Z | a | b | c | d |
| 5 101 | A | B | C | D | E | F | G | H | I | J | K | L | M | N | O | P | Q | R | S | T | U | V | W | X | Y | Z | a | b | c | d |
| 6 110 | A | B | C | D | E | F | G | H | I | J | K | L | M | N | O | P | Q | R | S | T | U | V | W | X | Y | Z | a | b | c |
| 7 111 | A | B | C | D | E | F | G | H | I | J | K | L | M | N | O | P | Q | R | S | T | U | V | | | | | | | | | |

FIG. 6

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 0 000 | A | B | C | D | E | F | G | H | I | J | K | L | M | N | O | P | Q | R | S | T | U | V | W | X | Y | Z | a | b | c | d | e |
| | | | | | | | | | | | | | | | | | | | | | | | | | | | | | | | f |
| 1 001 | A | B | C | D | E | F | G | H | I | J | K | L | M | N | O | P | Q | R | S | T | U | V | W | X | Y | Z | a | b | c | d | e | f |
| 2 010 | A | B | C | D | E | F | G | H | I | J | K | L | M | N | O | P | Q | R | S | T | U | V | W | X | Y | Z | a | b | c | d | e | f |
| 3 011 | A | B | C | D | E | F | G | H | I | J | K | L | M | N | O | P | Q | R | S | T | U | V | W | X | Y | Z | a | b | c | d | e |
| 4 100 | A | B | C | D | E | F | G | H | I | J | K | L | M | N | O | P | Q | R | S | T | U | V | W | X | Y | Z | a | b | c | d | e |
| 5 101 | A | B | C | D | E | F | G | H | I | J | K | L | M | N | O | P | Q | R | S | T | U | V | W | X | Y | Z | a | b | c | d | e | f |
| 6 110 | A | B | C | D | E | F | G | H | I | J | K | L | M | N | O | P | Q | R | S | T | U | V | W | X | Y | Z | a | b | | | | |
| 7 111 | A | B | C | D | E | F | G | H | I | J | K | L | M | N | O | P | Q | R | S | T | U | V | W | X | Y | Z | a | b | | | | |

FIG. 7

| 0 000 | A | B | C | D | E | F | G | H | I | J | K | L | M | N | O | P | Q | R | S | T | U | V | W | X | Y | Z | A | b | c | d | e | f |
| 1 001 | A | B | C | D | E | F | G | H | I | J | K | L | M | N | O | P | Q | R | S | T | U | V | W | X | Y | Z | a | b | c | d | e | f |
| 2 010 | A | B | C | D | E | F | G | H | I | J | K | L | M | N | O | P | Q | R | S | T | U | V | W | X | Y | Z | a | b | c | d | e | f |
| 3 011 | A | B | C | D | E | F | G | H | I | J | K | L | M | N | O | P | Q | R | S | T | U | V | W | X | Y | Z | a | b | c | d | e | |
| 4 100 | A | B | C | D | E | F | G | H | I | J | K | L | M | N | O | P | Q | R | S | T | U | V | W | X | Y | Z | a | b | c | d | e | |
| 5 101 | A | B | C | D | E | F | G | H | I | J | K | L | M | N | O | P | Q | R | S | T | U | V | W | X | Y | Z | a | b | c | d | | |
| 6 110 | A | B | C | D | E | F | G | | H | I | J | K | L | M | N | O | P | Q | R | S | T | U | V | W | X | Y | Z | a | b | c | d | e | f |
| 7 111 | A | B | C | D | E | F | G | | H | I | J | K | L | M | N | O | P | Q | R | S | T | U | V | W | X | Y | Z | a | b | c | d | e | f |

FIG. 8

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 0 000 | A | B | C | D | E | F | G | H | I | J | K | L | M | N | O | P | Q | R | S | T | U | V | W | X | Y | Z | a | b | c | d | e | f |
| 1 001 | A | B | C | D | E | F | G | H | I | J | K | L | M | N | O | P | Q | R | S | T | U | V | W | X | Y | Z | a | b | c | d | e | f |
| 2 010 | A | B | C | D | E | F | G | H | I | J | K | L | M | N | O | P | Q | R | S | T | U | V | W | X | Y | Z | a | b | c | d | e | f |
| 3 011 | A | B | C | D | E | F | G | H | I | J | K | L | M | N | O | P | Q | R | S | T | U | V | W | X | Y | Z | a | b | c | d | e | f |
| 4 100 | A | B | C | D | E | F | G | H | I | J | K | L | M | N | O | P | Q | R | S | T | U | V | W | X | Y | Z | a | b | c | d | e | f |
| 5 101 | A | B | C | D | E | F | G | H | I | J | K | L | M | N | O | P | Q | R | S | T | U | V | W | X | Y | Z | a | b | c | d | e | f |
| 6 110 | A | B | C | D | E | F | G | H | I | J | K | L | M | N | O | P | Q | R | S | T | U | V | W | X | Y | Z | a | b | c | d | e | f |
| 7 111 | A | B | C | D | E | F | G | H | I | J | K | L | M | N | O | P | Q | R | S | T | U | V | W | X | Y | Z | a | b | c | d | e | f |

| FIRST PARTIAL IDENTITY | A | B | C | D | E | F | G | c | k |
|---|---|---|---|---|---|---|---|---|---|
| SECOND PARTIAL IDENTITY | H | I | J | K | L | M | N | d | l |
| THIRD PARTIAL IDENTITY | V | W | X | Y | Z | a | b | e | m |
| FOURTH PARTIAL IDENTITY | O | P | Q | R | S | T | U | j | n |

FIG. 11

| FIRST PARTIAL IDENTITY | A | B | C | D | E | F | e |
|---|---|---|---|---|---|---|---|
| SECOND PARTIAL IDENTITY | G | H | I | J | K | L | j |
| THIRD PARTIAL IDENTITY | S | T | U | V | W | X | k |
| FOURTH PARTIAL IDENTITY | M | N | O | P | Q | R | l |
| FIFTH PARTIAL IDENTITY | Y | Z | a | b | c | d | m |
| SIXTH PARTIAL IDENTITY | Y | Z | a | b | c | d | n |

FIG. 12

| FIRST PARTIAL IDENTITY | A | B | C | D | E | F | j |
|---|---|---|---|---|---|---|---|
| SECOND PARTIAL IDENTITY | G | H | I | J | K | L | k |
| THIRD PARTIAL IDENTITY | S | T | U | V | W | X | l |
| FOURTH PARTIAL IDENTITY | M | N | O | P | Q | R | m |
| FIFTH PARTIAL IDENTITY | Y | Z | a | b | c | d | n |
| SIXTH PARTIAL IDENTITY | Y | Z | a | b | c | e | |

FIG. 13

| | | | | | | |
|---|---|---|---|---|---|---|
| FIRST PARTIAL IDENTITY | A | B | C | D | E | k | x |
| SECOND PARTIAL IDENTITY | F | G | H | I | J | l | y |
| THIRD PARTIAL IDENTITY | P | Q | R | S | T | m | z |
| FOURTH PARTIAL IDENTITY | K | L | M | N | O | n | |
| FIFTH PARTIAL IDENTITY | U | V | W | X | a | d | |
| SIXTH PARTIAL IDENTITY | U | V | W | Y | b | e | |
| SEVENTH PARTIAL IDENTITY | U | V | W | Z | c | j | |

FIG. 14

| | | | | | | |
|---|---|---|---|---|---|---|
| FIRST PARTIAL IDENTITY | A | B | C | D | E | l | y |
| SECOND PARTIAL IDENTITY | F | G | H | I | J | m | z |
| THIRD PARTIAL IDENTITY | P | Q | R | S | T | n | |
| FOURTH PARTIAL IDENTITY | K | L | M | N | O | x | |
| FIFTH PARTIAL IDENTITY | U | V | W | X | Y | b | e |
| SIXTH PARTIAL IDENTITY | U | V | W | X | Z | c | j |
| SEVENTH PARTIAL IDENTITY | U | V | W | X | a | d | k |

FIG. 15

| | | | | | | |
|---|---|---|---|---|---|---|
| FIRST PARTIAL IDENTITY | A | B | C | D | E | e | m |
| SECOND PARTIAL IDENTITY | F | G | H | I | J | j | n |
| THIRD PARTIAL IDENTITY | P | Q | R | S | T | k | x |
| FOURTH PARTIAL IDENTITY | K | L | M | N | O | l | y |
| FIFTH PARTIAL IDENTITY | U | V | W | X | Y | b | z |
| SIXTH PARTIAL IDENTITY | U | V | W | X | Z | c | |
| SEVENTH PARTIAL IDENTITY | U | V | W | X | a | d | |

FIG. 16

METHOD, AND ASSOCIATED APPARATUS, OF INTEGRATING EXTRACTION OF EXTRA PARTIAL IDENTITY BITS WITH QUICK PAGING TECHNIQUES WHERE MULTIPLE PAGES SHARE A MESSAGE FIELD

CROSS REFERENCE TO RELATED APPLICATIONS

The present invention claims the priority of provisional patent application No. 60/842,593, filed on Sep. 5, 2006, the contents of which are incorporated herein by reference.

The present invention relates generally to a manner by which to page an access terminal of a radio communication system to alert the access terminal of a pending call, or other communication. More particularly, the present invention relates to apparatus, and an associated method, by which to form a quick page.

BACKGROUND OF THE INVENTION

Advancements in communication technologies have permitted the development and deployment of new types of communication systems and communication services. Cellular telephony, and associated communication services available therethrough, are popularly utilized by many, typically providing users with communication mobility and also provides the capability of communications when the use of wireline communication systems would not be practical or possible.

While early-generation, cellular communication systems provided primarily for voice communications and only limited data communication services, newer-generation systems increasingly provide for high-speed data communication services at variable data communication rates. A CDMA2000, cellular communication system that provides for EV-DO services is an exemplary type of new-generation, cellular communication system that provides for high-speed data services. Operational details and protocols defining communications and operational requirements of devices of the system are set forth in an operating standard specification. Various aspects of operation of the CDMA2000 EV-DO communication scheme remain to be standardized and certain parts of the existing standard specification are considered for amendment. Various successor-generation communication schemes are also undergoing standardization and yet others are envisioned to be standardized.

For instance, a revision to the standard specification, release B of the CDMA2000 EV-DO specification standard defines a quick paging channel (QPCH) available upon which to broadcast access-terminal pages by an access network (AN) to an access terminal (AT). The QPCH was adopted in industry contributions 3GPP2 C20-20060323-013R1 and 3GPP2 C20-20060323-003R1 and published in 3GPP2 document C.S0024-B V1.0. Generally, pages are broadcast by the access network to an access terminal to alert the access terminal of a pending communication. And by so alerting the access terminal, the access terminal performs actions to permit the effectuation of the communication. Page indications broadcast upon the quick paging channel are broadcast in a manner that facilitates reduced battery consumption of the access terminal by reducing the battery consumption of the battery of the access terminal. Increased battery longevity is provided, reducing the rate at which a battery of the access terminal must be recharged. The access terminal is, as a result, able to be operated for a greater period of time between rechargings or battery replacement. The aforementioned promulgations provide for broadcast of a message including page indications upon a physical logical layer that is monitored by the access terminal. The access terminal monitors the QPCH prior to monitoring the control channel to receive regular, control channel MAC (medium access control) messages such as page messages. A quick page message is broadcast upon the QPCH.

In one configuration, the quick page message contains quick page indicators. The quick page message includes a number of quick page indicator slots populated with the quick page indicators that indicate whether an access terminal is being paged. An exemplary configuration of a scheme that utilizes page indications is set forth, for instance, in industry contribution 3GPP2 C20-20060731-033. In this configuration, during operation, a mobile station hashes to a quick page indicator location, i.e., slot, within the quick page message based upon a session seed, a 32-bit pseudorandom number. If the quick page indicator of the quick page indicator slot to which the access terminal hashes indicates that the access terminal is not being paged, the access terminal enters into a sleep state, a reduced-power state, in which the access terminal does not remain powered at a level to receive the regular control channel MAC messages. Power savings is particularly significant in the event that the control channel MAC messages are lengthy and span multiple control channel frames or capsules.

In another configuration, a partial hash comparison scheme is provided. In the disclosed partial hash comparison scheme, the access network forms a quick page message in which a portion of a hash of an access terminal identifier (ATI) of an access terminal that is paged is placed in the quick page message. An access terminal that monitors for the delivery of a quick page message, reads the content of the message and compares the values with corresponding values, that is, portions of a hash of the identifier of that access terminal. If the values do not match, then the access terminal enters into a reduced power state, e.g., a sleep state.

The QPCH message, as presently-proposed, provides thirty-five page indication locations, i.e., bits available to be populated with paging indicators. The aforementioned "partial hash comparison" scheme utilizes three of the thirty-five page indication locations for identifying the number of pages, and the remaining page indication locations are available for paging, viz., are available. While the proposed, partial hash comparison scheme reduces the false wakeup probability when paging load is relatively low, when the paging load increases, the reduction in the available page indication locations actually increases the possibility of false wakeup. When more than five access terminals are paged, partial hash comparison is not used due to this increased possibility. Instead, hashing to page indication locations is performed.

If a manner could be provided by which to improve the performance of a scheme that utilizes partial comparison pursuant to paging by better reducing the possibility of false wakeup, improved battery longevity of the access terminal would be possible.

It is in light of this background information related to paging by an access network of an access terminal that the significant improvements of the present invention have evolved.

BRIEF DESCRIPTION OF THE DRAWINGS

FIG. 6 illustrates structures that are used in a quick page message to convey partial identities.

FIG. 7 illustrates many of the same structures of FIG. 6 but eliminates some in favor of others.

FIG. 8 illustrates another group of structures used for quick paging.

FIG. 9 illustrates structures similar to those shown in FIG. 8.

FIG. 10 illustrates a set of structures that include support for ordering and extraction of extra bits.

FIG. 11 illustrates how the structure '0001' of FIG. 10 is used to page four access terminals.

FIG. 12 illustrates how the structure '0010' is used to page six access terminals.

FIG. 13 illustrates how the structure '0111' is used to page six access terminals.

FIG. 14 illustrates how the structure '1000' is used to page seven access terminals.

FIG. 15 illustrates how the structure '1001' is used to page seven access terminals.

FIG. 16 illustrates an alternative way to page seven access terminals.

DETAILED DESCRIPTION

Figure 1:
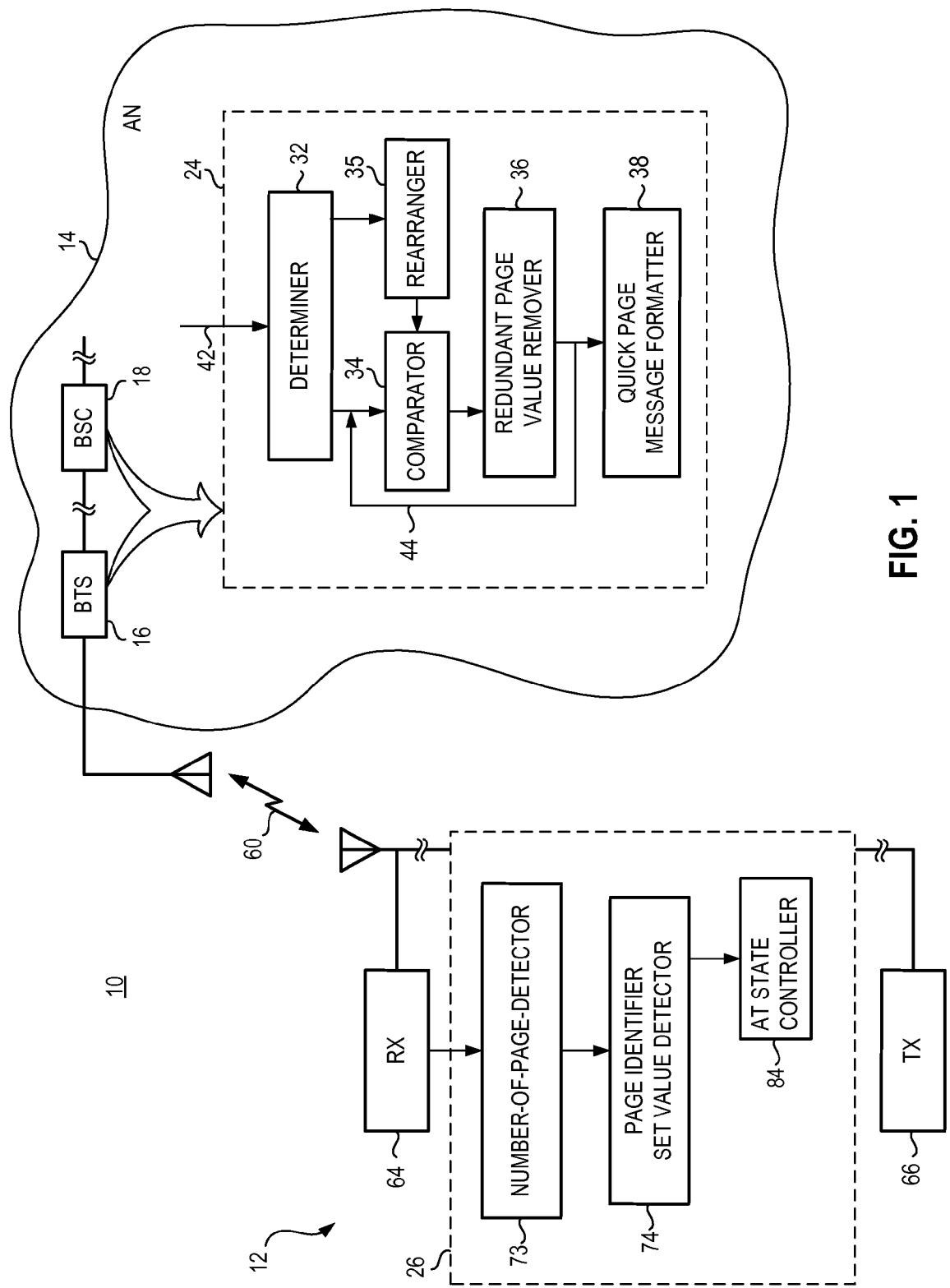
FIG. 1 illustrates a functional block diagram of a radio communication system in which an embodiment of the present invention is operable.

The present invention, accordingly, advantageously provides apparatus, and an associated method, by which to page an access terminal of a radio communication system to alert the access terminal of a pending call, or other communication.

Through operation of an embodiment of the present invention, a manner is provided by which to form a quick page message that is selectably free of redundant values.

Improved quick paging is provided that lessens the likelihood of false wakeup of an access terminal, thereby improving the longevity of the battery that powers the access terminal. Pursuant to operation, when quick paging is performed using a partial identity comparison, the pages included in the quick page message are of configurations and lengths best to minimize the occurrence of false wakeup of the access terminal.

In another aspect of the present invention, a partial identity scheme is utilized in the quick paging procedure. The partial identity comparison utilizes parts of access terminal identifiers (ATIs) or other numbers that are associated with access terminals that are paged. The portion of the ATI, or other number, that is included in the quick page message comprises, for instance, a selected number of most significant bits of the number. The length of the portion of the number included in the quick page message is dependent upon one or more factors.

As the length of the quick page message is prescribed, e.g., is of a thirty-five bit length, the lengths of the parts of the ATIs or other numbers included in the quick page message are limited by this prescribed length. If multiple pages are contained in the quick page message, only fractional portions of the parts of the ATIs or other numbers are able to be included in the quick page message. When the number of pages increase, the size, i.e., lengths, of the parts of the numbers that are includable in the quick page message are reduced.

A first portion of the quick page message, such as a first, three-bit portion, identifies the number of pages in the message. If the quick page message is of a length of thirty-five bits, and, e.g., the number of page indications is three-bits in length, then the number of bits available to identify the access terminals is reduced to thirty-two of the thirty-five bits. When a single access terminal is paged, all thirty-two bits are available by which to identify the paged access terminal. When two access terminals are paged, half of the thirty-two available bits are available to identify each of the two access terminals being paged. Analogously, when three access terminals are paged, one-third of the thirty-two bits are available to identify each of the three access terminals being paged. Because three does not divide into thirty-two equally, the number of bits available to identify different ones of the three access terminals is dissimilar. Or, one or more bits are not utilized to identify the paged access terminals. Analogous divisions and distributions are provided for higher numbers of paged access terminals.

In another aspect of the present invention, a determination is first made of the number of pages that are to be included in the quick page message. And, the corresponding parts of ATIs or other numbers that are used to identify the paged access terminals are configured. The most significant bits, for instance, of the number known to both the access terminal and the access network are used. For example, parts of the ATIs are utilized. For example, if sixteen bits are available to identify an access terminal, such as when the quick page message is to page two access terminals, the sixteen most significant bits of the number are utilized. If preferred, least significant bits are instead utilized. A comparator compares the values that identify the access terminals. In the event that the values identifying the different access terminals that are to be paged correspond, then redundant values are deleted by a redundant page value remover. The bits that would otherwise need to be provided for population with the redundant values are able, instead, to be utilized for other purposes.

In a further aspect of the present invention, all of the bit locations of the quick page message available to identify access terminals are used. The number of bits available to identify each access terminal need not be equal. For instance, if three access terminals are to be paged in the quick page message, two of the terminals are identified with ten bit values while a third of the access terminals is identified with an eleven bit-length value. Through use of all of the available parts of the quick page message, false wakeup of an access terminal is proportionately less likely to occur.

In these and other aspects, therefore, apparatus, and an associated method, is provided for an access network of a communication network that generates a first page message on a first paging channel. A determiner is configured to determine page values of each page identifier set of each page intended to be included in the first page message. A redundant page value remover is configured selectably to remove page values intended to be included in the first page message that are redundant to page values of another page identifier set, if any, also intended to be part of the first page message. The first page message is formed of page value sets selectably free of page value set redundancies.

In these and further aspects, apparatus, and an associated method, is provided for an access terminal that monitors a first paging channel for delivery of a first paging message. A number of page detector is configured to detect how many page identifier sets are included in the first paging message. A page identifier set value detector is configured to detect values of each page identifier set detected by the number of page detector to be included in the first paging message. The first paging message is selectably free of page value set redundancies.

Referring first, therefore, to FIG. 1, a radio communication system, shown generally at 10, provides for communications with access terminals, of which the access terminal 12 is exemplary. The communication system forms a multi-user communication system that typically includes a large number of access terminals and a plurality of concurrent communication dialogs. While only a single access terminal is shown in FIG. 1, additional access terminals, analogous to the access terminal 12, typically form a portion of the communication system.

Communications are effectuated between an access terminal and a radio network 14, formed of fixed network infrastructure elements, such as a base transceiver station (BTS) 16 and a base station controller (BSC) 18. The access network encompasses a geographical area within which communications with the access network are possible. That is to say, when an access terminal is positioned within the area encompassed by the access network, the access terminal is generally able to communicate with the access network, and the access network is typically able to communicate with the access terminal.

The communication system is operable in general conformity with the operating protocols and parameters of an appropriate communication specification standard. The description set forth herein is exemplary, and the teachings of various embodiments of the present invention are implementable in any of various types of communication systems.

As previously mentioned, access terminals are alerted, by broadcast of a page message when a communication, initiated at the network, is to be terminated at an access terminal. A quick paging channel (QPCH), or analogous channel, is defined. Information contained in a quick page message broadcast on the quick paging channel identifies access terminals that are paged. When an access terminal detects, from the quick page message, that the access terminal is paged, the access terminal further operates in anticipation of the page and subsequent communication. The access terminal, conversely, enters into a reduced-power consumption state, e.g., a sleep state. If the access terminal incorrectly determines that it is being paged, the access terminal falsely wakes up. And, increased levels of power are consumed by the access terminal, resulting in reduced battery longevity. The aforementioned partial hash comparison scheme is intended to reduce the likelihood of false wakeup of the access terminal, but, as presently implemented, provides advantages only when a quick page message pages five or fewer access terminals. Additionally, not all of the bits of a quick page message are fully utilized in every paging scenario, and the existing scheme, for this reason, is less than ideal.

Accordingly, pursuant to an embodiment of the present invention, the access network includes apparatus 24, and the access terminal includes apparatus 26, that operate pursuant to quick page message generation and quick page message receipt in manners that reduce the likelihood of occurrence of false wakeup relative to an existing partial hash comparison scheme. The elements of the apparatus 24 and of the apparatus 26 are functionally represented, implementable in any desired manner, including, for instance, by algorithms executable by processing circuitry.

The elements forming the apparatus 24 are implemented at any appropriate location of the access network, including, as illustrated, at the BTS 16 or BSC 18, or distributed amongst such entities, as well as others.

Here, the apparatus 24 includes a determiner 32, a comparator 34, a rearranger 35, a redundant page value remover 36, a set structure definer 37, and a quick page message formatter 38.

The determiner 32 operates to determine page values of page identifier sets that are associated with access terminals that are to be paged in a quick page message. That is to say, the determiner is provided, here indicated by way of the lines 42, with the identities, such as by their ATIs, of the access terminals that are to be paged. The number of terminals that are paged is determinative of the lengths of the page identifier sets that are includable in the quick page message. When more pages are to be included in the page message, the lengths of the page identifier sets that identify each of the access terminals being paged are less than the lengths permitted when fewer numbers of access terminals are being paged. Most significant bits, e.g., or other bits of the ATIs are used. And, the determiner determines the parts of the ATIs that can be used, depending upon the number of pages to be included in the quick page message. If two pages are to be included in the quick page message, each page identifier set is of sixteen-bit lengths, the sixteen most significant bits of the ATIs. When numbers other than ATIs are used, analogous portions of such other numbers are, e.g., instead utilized. In the exemplary implementation in which thirty-two bits are available in which to identify the access terminals and three bits are used to identify the number of pages in the quick page message, the thirty-two bits are collectively available by which to be used to identify access terminals that are to be paged. Pursuant to a further embodiment of the present invention, in the event that the number of access terminals that are to be paged do not permit for an equal division of the thirty-two bits, unequal numbers of bits are allocated to identify different ones of the access terminals while fully utilizing all thirty-two available bits. For instance, when three access terminals are to be paged, one access terminal is identified with an eleven-bit length page identifier set while the other two access terminals are identified with ten-bit length page identifier sets.

Indications of the identifiers determined by the determiner are provided to a rearranger 35. The rearranger rearranges bit lengths of one or more of the partial identifier sets to increase the likelihood of occurrence of redundancy of partial identifier and provides the sets, once rearranged, to a comparator 34. The comparator 34 operates to compare the different values and to identify if any of the page identifier sets are of identical values. When parts of the ATIs are utilized, that is to say, the selected number of most significant bits of the ATIs of the access terminals that are to be paged are used, there is a possibility that the most significant bits identifying more than one access terminal are identical to the corresponding values that identify another access terminal. Operation of the comparator identifies such identical values.

Indications of comparisons made by the comparator are provided to the redundant page value remover 36. The redundant page value remover removes values, that is to say, page identifier set bits, that are redundant, freeing up bit space in the quick page message. In the exemplary implementation, upon removal of the redundant bit values, the determiner is caused to redetermine the page values of the identifiers of the access terminals that are to be paged. And the set structure definer 37 defines a set structure to be used in the quick page message. Set structures, and their contents, are provided by the determiner to the redundant page value remover and thereafter provided to the quick page message formatter 38.

The quick page message formatter forms the quick page message populated with page identifier sets that are selectably free of redundancies through the removal of the redundant page value remover, comparator 34, and determiner 32.

Transceiver elements of the base transceiver station 16 cause broadcast of quick page messages that have been formatted by the quick page message formatter. The messages are broadcast upon a radio air interface, represented in FIG. 1 by the arrow 60. The messages are delivered to access terminals, such as the access terminal 12, within reception range of the broadcast messages. The access terminal 12 includes transceiver circuitry, here represented by a receive part 64 and a transmit part 66. The receive part 64 operates to receive signals sent thereto, such as the quick page messages broadcast by the access network. And, certain of the detected signals are provided to the apparatus 26 embodied at the access terminal. Of significance here are detections of the quick page message broadcast by the access network.

The apparatus 26 includes a number of page detector 73 and a page identifier set value detector 74. The elements are functionally represented, also implementable in any desired manner, including algorithms executable by processing circuitry. The detector 73 detects an indication in the quick page message of the number of pages that are included in the received quick page message. The number of pages are indicated in, e.g., and as noted above, a three-bit segment of the quick page message. Detection of such indication is used by the page identifier set value detector in the detection of the page identifier sets, thereby to determine whether the access terminal is paged. Additional operation at the access terminal determines, in response to the number of pages detected by the page detector of the page value lengths of the page identifier set or sets contained in the quick page message. In the event that the detector detects the access terminal not to be paged, an indication is provided to an access terminal (AT) state controller 84 to cause the access terminal to be placed in a reduced-power state, e.g., a sleep mode. If a page is detected, conversely, an indication is provided to the state controller and the controller causes the state of the access terminal to permit its further operation with respect to paging and further communication.

While the existing partial hash comparison scheme is used only when five or fewer access terminals are paged, operation of an embodiment of the present invention is potentially permitting of performance of a partial identity comparison scheme in the event that more than five access terminals are being paged, but one or more of the identifiers, that is, page identifier sets are identical. For example, if seven access terminals are being paged and three of the access terminals being paged have the same six bits as their most significant bits, the apparatus 24 operates to eliminate two of the three duplicates page identifier sets and is then able to include five six-bit page identifier sets, herein also referred to as hashes, using partial identity comparison. Otherwise, individual page indication bits are inserted in specified locations of the message, their locations being selected through operation of a hash function generator.

Figure 2:
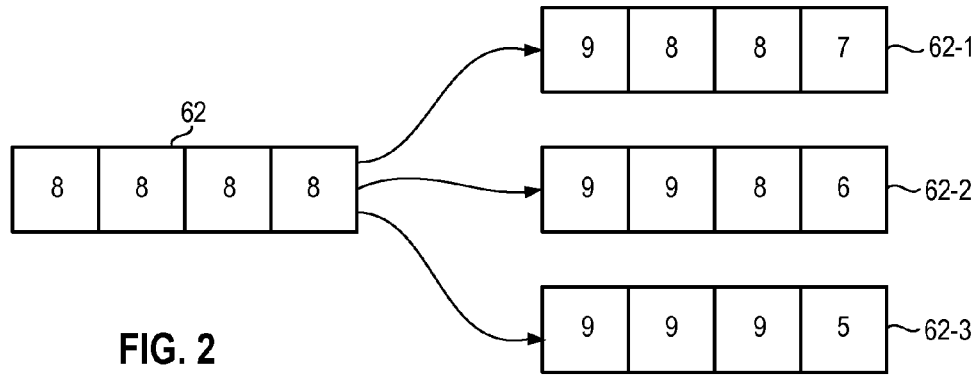
FIG. 2 illustrates a representation of exemplary structures formable pursuant to operation of an embodiment of the present invention.

FIG. 2 illustrates an exemplary representation of operation of rearrangement, such as that performed by the rearranger 35 shown in FIG. 1. Here, the structure, represented at 62 of a quick page message, such as that determined by the determiner 32 shown in FIG. 1, includes four partial identifiers, each of eight-bit lengths. Rearrangement performed by the rearranger creates any of various alternate structures of which structures 62-1, 62-2, and 62-3 are shown. The structure 62-1 is of bit lengths of nine-bit, eight-bit, eight-bit, and seven-bit lengths, respectively. The structure 62-2 includes partial identifiers of bit-lengths of nine bits, nine bits, eight bits, and six bits, respectively. And, the structure 62-3 is formed of partial identifiers of nine-bit, nine-bit, nine-bit, and five-bit lengths, respectively.

Figure 3:
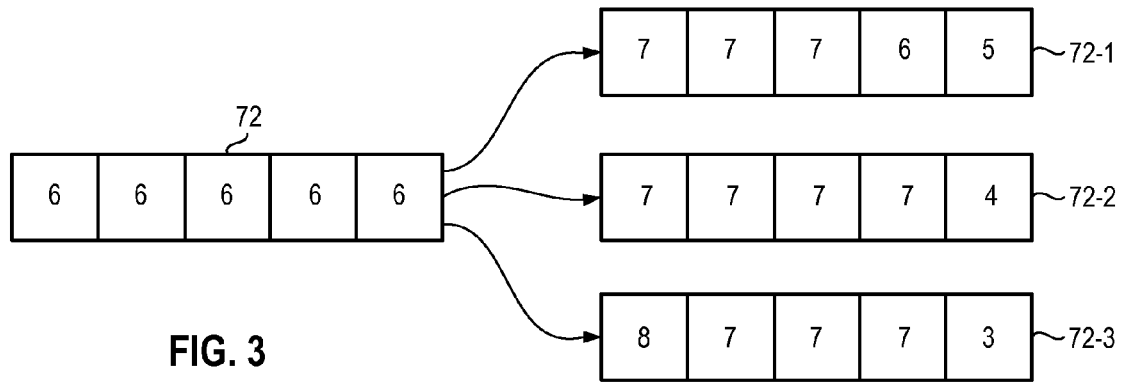
FIG. 3 illustrates a representation similar to that shown in FIG. 2, but of other exemplary structures formable during operation of one embodiment of the present invention.

FIG. 3 illustrates other exemplary structures formable pursuant to operation of an embodiment of the present invention. Here, a structure initially formed includes partial identifiers of five access terminals. Initially, each of the partial identifiers is of a six-bit length. Rearrangement operations form any of various alternate structures, of which three alternate structures, designated as 72-1, 72-2, and 72-3 are shown in the figure. The structure 72-1 includes partial identifiers of seven-bit, seven-bit, seven-bit, six-bit, and five-bit lengths, respectively. The structure 72-2 is formed of partial identifiers of seven-bit, seven-bit, seven-bit, seven-bit, and four-bit lengths, respectively. And, the structure 72-3 is formed of partial identifiers of eight-bit, seven-bit, seven-bit, seven-bit, and three-bit lengths, respectively.

Referring back to FIG. 1 again, transceiver elements of the base transceiver station 16 cause broadcast of quick page messages that have been formatted by the quick page message formatter. The messages are broadcast upon a radio air interface, represented in FIG. 1 by the arrow 62. The messages are delivered to access terminals, such as the access terminal 12, within reception range of the broadcast messages. The access terminal 12 includes transceiver circuitry, here represented by a receive part 64 and a transmit part 66. The receive part 64 operates to receive signals sent thereto, such as the quick page messages broadcast by the access network. And, certain of the detected signals are provided to the apparatus 26 embodied at the access terminal. Of significance here are detections of the quick page message broadcast by the access network.

The apparatus 26 includes a number of page detector 72 and a page identifier set value detector 74. The elements are functionally represented, also implementable in any desired manner, including algorithms executable by processing circuitry. The detector 72 detects an indication in the quick page message of the number of pages that are included in the received quick page message. The number of pages are indicated in, e.g., and as noted above, a three-bit segment of the quick page message. Detection of such indication is used by the page identifier set value detector in the detection of the page identifier sets, thereby to determine whether the access terminal is paged. Additional operation at the access terminal determines, in response to the number of pages detected by the page detector of the page value lengths of the page identifier set or sets contained in the quick page message. In the event that the detector detects the access terminal not to be paged, an indication is provided to an access terminal (AT) state controller 84 to cause the access terminal to be placed in a reduced-power state, e.g., a sleep mode. If a page is detected, conversely, an indication is provided to the state controller and the controller causes the state of the access terminal to permit its further operation with respect to paging and further communication.

The false wakeup probability at an access terminal is governed by the equation:

$$1-[1-"1/2"^n]$$

Wherein:
n identifies the number, i.e., bit length, of partial identifiers.

Through operation of an embodiment of the present invention, new structures are provided that, when used, reduce the likelihood of occurrence of false wakeup. FIGS. 2 and 3 illustrate various of the new structures when four and five identifiers are to be paged within a quick page message.

During operation of an embodiment of the present invention, the number of bits for one of the partial identifiers is lowered in order to give a higher probability of a match of, viz., redundancy with, another partial identifier. In an example of five pages within a quick page message, there is a fifty-one percent possibility of occurrence of at least two five-bit partial identifiers being a match. Analogously, there is a twenty-eight percent probability of match of six-bit partial identifiers, a fifteen percent probability of redundancy of at least two seven-bit partial identifiers, and an eight percent probability of redundancy of at least two eight-bit partial identifiers. Structures are used if the likelihood of false wakeup for the structure is less than the likelihood of false wakeup when a hashing to individual page indication locations and use of single-bit identifiers are used.

The false wakeup probability for the structure 62-1 shown in FIG. 2 is governed by the following equation:

$$1 - \left(1 - \frac{1}{2^9}\right)\left(1 - \frac{1}{2^8}\right)^2\left(1 - \frac{1}{2^7}\right)$$

The false wakeup probability for the structure 62-2 shown in FIG. 2 is:

$$1 - \left(1 - \frac{1}{2^9}\right)^2\left(1 - \frac{1}{2^8}\right)\left(1 - \frac{1}{2^6}\right)$$

The structure that exhibits the lowest false wakeup probability and that generates a partial identifier that can be eliminated, if any, is the structure used by the access network. The overall false wakeup probability for a number of pages is determinable by summing the products of the various false wakeup probabilities for the new structure and the percentage of page combinations that would use them together with the product of the false wakeup probability of a page indication method for the number of pages and the percentage of page combinations where matches are unable to be made.

Figure 4:
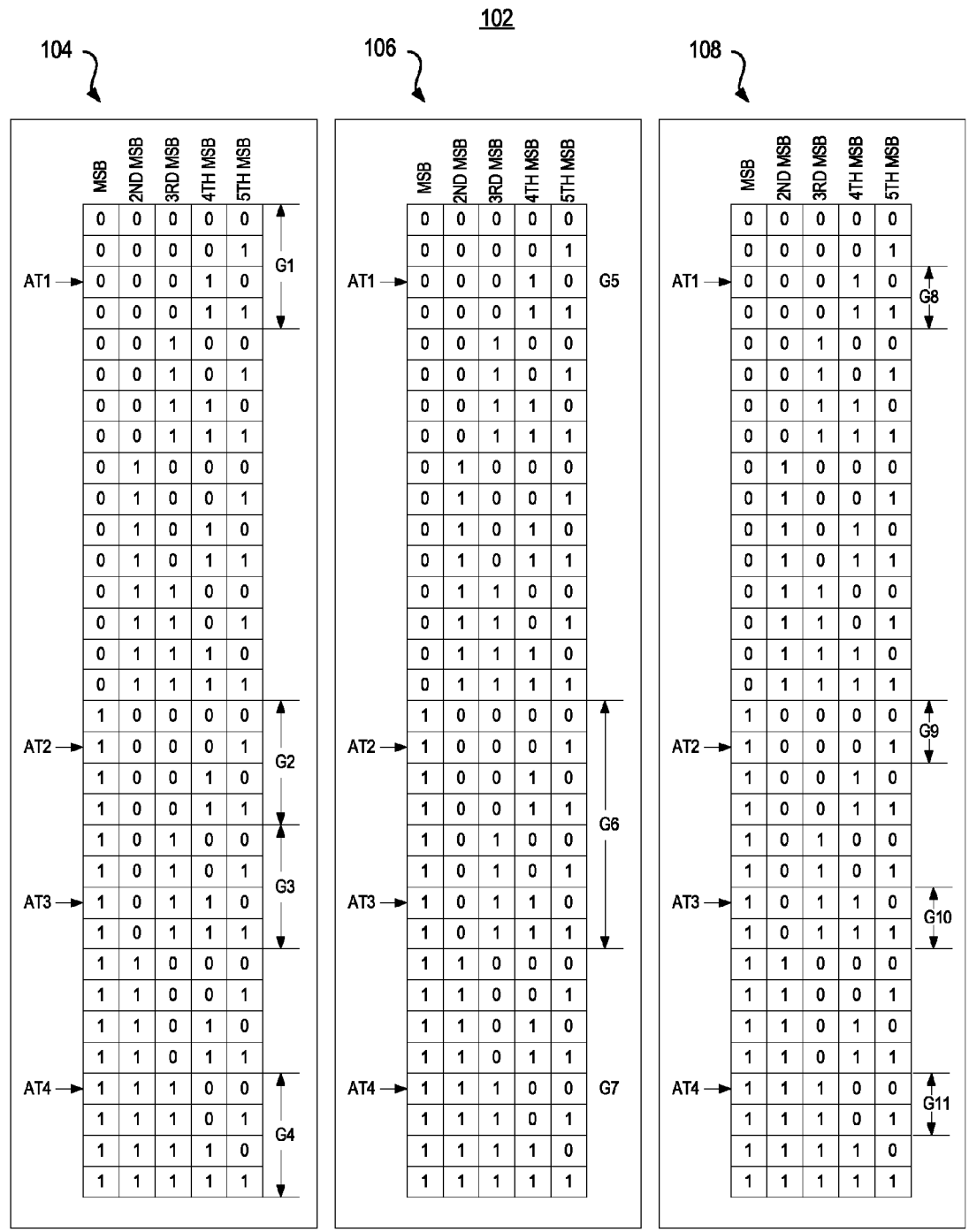
FIG. 4 illustrates a representation of exemplary paging, and occurrence of partial wakeup, pursuant to various paging schemes, including the paging scheme using a set structure pursuant to an embodiment of the present invention.

FIG. 4 illustrates a group, shown generally at 102, of partial identifiers that identify access terminals and occurrences of false wakeup of various of such access terminals pursuant to various quick paging schemes. Here, representations of three paging schemes are shown at 104, 106, and 108. The first paging scheme is representative of a conventional partial comparison scheme in which partial identifiers contained in a paging message are all of equal-numbered bit lengths. The scheme 106 is representative of a scheme in which partial redundancies are removed to lessen the likelihood of false wakeup. And, the scheme 108 is representative of the scheme of an embodiment of the present invention in which set structures are utilized to minimize the occurrence of false wakeup.

The exemplary operations shown by the schemes 104, 106, and 108 are of operation in which a quick page message includes twelve bits available by which to identify all of the access terminals that are paged. Operation with respect to a quick page message that includes other numbers of available bits, such as the thirty-two bits described above, is analogous.

Additionally, in the examples of FIG. 4, four access terminals, access terminals AT1, AT2, AT3, and AT4, are paged. And, each grouping 104, 106, and 108 illustrates the five most significant bits (MSBs) of an identifier amenable to identify any of the access terminals. And, as indicated by the four access terminals, AT1, AT2, AT3, and AT4, the access terminal AT1 has as its most five significant partial identity bits of '00010'. Analogously, the access terminal AT2 is identified by its five most significant bits of '10001'. The access terminal AT3 has as its five most significant bits '10110'. And, the access terminal AT4 has as its five most significant bits the values '11100'.

In the example in which twelve bits are available in the quick page message and four access terminals are paged, the scheme of grouping 104 forms a quick page message in which three bits are available to each of the four access terminals, that is to say, twelve divided by four. In such a structure, the bits would be: '000', '100', '101', and '111'. Such values correspond to the most significant bits, the three most significant bits, the access terminals AT1, AT2, AT3, and AT4, respectively. Groups identified as G1, G2, G3, and G4 identify access terminals that are awakened by the quick page. Sixteen of the access terminals are awakened, not merely the access terminals that are being paged.

The scheme represented by the grouping 106 reduces the occurrence of false wakeup relative to the scheme represented by the grouping 104. In this example, the four pages to the four access terminals are represented by three partial identities. One of the partial identities is chosen such that two of the partial identities will be of the same values, that is, be redundant. In this example, the access terminals AT2 and AT3 have the same most significant two partial identity bits while both the access terminals AT1 and AT4 differ more significantly in their respective most significant partial identity bits. Therefore, a structure here is used that allows the access terminals AT2 and AT3 to share two bits. The structure of the quick page message includes a first page of five bits, a second page of five bits, and a third page of two bits. And, the bits in the structure are of values in '00010', '11100', and '10', corresponding to the access terminals AT1, AT4, and AT2/AT3, respectively.

Here, the groups G5, G6, and G7 are the groups of access terminals that are awakened by the quick page message. Groups G5 and G7 include only the access terminals AT1 and AT4, respectively. And, the group G6 includes values associated with eight access terminals. Comparison of the groupings 104 and 106 illustrates the improvement provided by the selection of the unequal bit lengths of the pages contained in the quick page message.

The grouping 108 represents paging in which a page message is formed of set structures. The structure is here used to match a smallest number of partial identities with various numbers of pages. For example, a '552' structure is used, if desired, to page four access terminals if the most significant two partial identity bits of two access terminals are the same. The same '552' structure is also usable to page five access terminals if the most significant two partial identity bits of the three access terminals are the same. In various scenarios, the added flexibility of being able to use a structure for additional numbers of pages does not necessarily provide substantial additional benefit. Through the use of set structures, the flexibility is lost, but, as illustrated in the example, further decrease in the likelihood of false wakeup. By way of an example, a '44211' quick paging structure is used to represent the exemplary four pages of which two of the partial identifiers share the most significant two partial identity bits. This same structure would not be used, however, in an example of five pages of which three access terminals share common values of their two most significant partial identity bits. In this '44211' structure, the values are: '0001', '1110', '10', '0', and '1'. The values '0001' correspond to the four most significant bits of the access terminal AT1. The values '1110' correspond to the four most significant bits of the partial identifier of the access terminal AT4. The values '10' correspond to the values of the two most significant bits of the partial identifiers of the access terminals AT2 and AT3. And, the remaining bits, i.e., '0' and '1', represent less significant bits of the access terminals AT2 and AT3. It should be noted that a '543' structure is also available and this structure would instead be used in the event of matches on the three most significant bits of two of the access terminals.

By the selection of the example, therefore, an assumption can be made that the access terminals AT2 and AT3 have third most significant bits of different values. Therefore, the first bit following the two-bit partial identifier set in the '44211' set structure is assumed to be associated with the access terminal that has '0' as its third most significant bit. Analogously, the last bit in the '44211' structure is assumed to be associated with the access terminal that has the page value of '1' as its third most significant bit. Therefore, the '0' in the structure corresponds to the fourth most significant bit of the second access terminal, and the value in '1' in the set structure corresponds to the fourth most significant bit of the third access terminal.

The groups G8, G9, G10, and G11 illustrate the groups of access terminals that are awakened by the quick page message of the aforementioned set structure. Here, a lessened number of access terminals are falsely awakened. Comparison of the access terminals awakened by the examples of the grouping 108 with the groupings 106 and 104 illustrates the further reduction in the false wakeup. Additional note is made pertaining to the '543' structure briefly noted above. The set structure is not used, for example, if the number of possible structures is limited and the second-to-last and the last bits in the structure represent the third most significant bit of the access terminal AT2 and the third most significant bit of the access terminal AT3, respectively.

In this example, in the event that the '543' set structure is available, the effect of the new structure is to specify four bits of each of the four access terminals even though only twelve bits are available. Two bits are duplicated for the two access terminals and two bits are implied. The effect is to compress the sixteen bits of the four access terminals into twelve bits. Even though an uneven number of bits is sent in the set structure for each of the four access terminals, in effect, four bits are represented for each access terminal. Preferably, an even number of bits is represented for each access terminal.

In the example of the '543' structure, if a '444' structure is available, the fourth most significant bits of the access terminals that match the three most significant bits are implied in the same way as described above for the fourth most significant bits.

Figure 5:
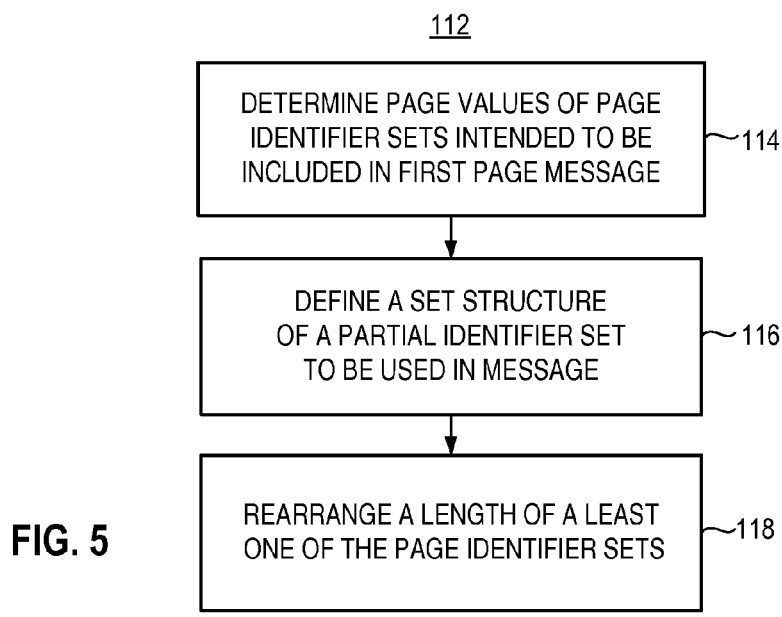
FIG. 5 illustrates a method flow diagram listing the method of operation of an embodiment of the present invention.

FIG. 5 illustrates a method, shown generally at 112, representative of the method of operation of an embodiment of the present invention. The method facilitates paging by an access network that selectably generates a first page message on a first paging channel.

First, and as indicated by the block 114, page values of each page identifier set of each page intended to be included in the first page message are determined. Then, and as indicated by the block 116, a set structure of partial identifier sets is defined to be included in the first paging message.

Then, and as indicated by the block 118, a length of at least one of the page identifier sets of pages intended to be included in the first page message are rearranged. Rearrangement is made in a manner that facilitates reduction in a probability parameter.

The previous descriptions are of preferred examples for implementing the invention, and the scope of the invention should not necessarily be limited by this description. The scope of the present invention is defined by the following claims.

The disclosure aims to improve partial identity comparison techniques (i.e. reduce the false wakeup probability) where multiple pages in a quick page message will share a number of bits used for partial comparison. 3GPP2 contribution C22-20060825-003 proposes an alternate method to improve partial identity comparison techniques by conveying additional partial identity bits via the ordering of the partial identities in the quick page message.

An object of the disclosure is to combine and integrate techniques in order to further reduce the false wakeup probability.

The attached FIGS. 6-16 illustrate operation of an embodiment of the present invention by which the extraction of partial identity bits is integrated with a shared partial address bits scheme.

FIG. 6 shows structures that are used in a quick page message to convey partial identities used for partial identity comparison. The quick page message also includes a three-bit field shown at left-side (as shown) of FIG. 1 that identifies which of the various structures is being used. The structure with index of 0 is used to specify the partial identity bits of a single AT. The structure with index of 1 is broken into two fields, A . . . P and Q . . . f. These two fields are used to convey partial identities of two different ATs.

As described in the aforementioned 3GPP2 contribution C22-20060825-003, the order of the two fields can be used to convey an additional identity bit. When the AT receives the quick page message, if the two partial identities are different, the AT will extract the bit based upon the ordering and append it to the end of the smaller of the two partial identities (note that choosing the smaller is just an example; it could also be the larger as long as both the AN and the AT are in agreement). The structure with index of 2 is broken into five fields, A . . . J, K . . . T, U . . . d, e, and f. The fields A . . . J, K . . . T, and U . . . d are used to specify 10-bit identity portions of three different ATs. The order of the three fields is used to convey additional identity bits. The number of additional identity bits depends upon which ordering is used and also how many of the three fields are identical.

The AT sorts the identities from smallest to largest. The AT adds the first extracted bit to the end of the first of the sorted identities, add the second extracted bit (if available) to the end of the second of the sorted identities, add the third extracted bit (if available) to the end of the third of the sorted identities. The bit in the e field will be added to the end of the next of the sorted identities; it should be noted that after a bit has been added to each of the three identities that the next bit is added to the end of the first of the sorted identities. Likewise, the bit in the f fields are added to the end of the next of the sorted identities.

The structure with index of 3 is broken into four fields, A . . . H, I . . . P, Q . . . X, and Y . . . f. A . . . H, I . . . P, Q . . . X, and Y . . . f are used to specify 8-bit identity portions of four different ATs. The ordering and bit extraction for this structure are done in a similar manner as is done with the structure with index of 1, with the extracted bits being evenly distributed among the four ATs. The structure with index of 4 is broken into seven fields, A . . . F, G . . . L, M . . . R, S . . . X, Y . . . d, e, and f. A . . . F, G . . . L, M . . . R, S . . . X, and Y . . . d are used to specify 6-bit identity portions of five different ATs. The ordering and bit extraction for this structure are done in a similar manner as is done with the structure with index of 2, with the extracted bits being distributed in order and evenly among the five ATs. The bits in the e and f fields are added after the extracted bits.

The structure with index of 5 is identical to the structure with index of 4. The index 5 has a special meaning which will cause the bit extraction to work differently than with the structure having index 4. In addition, the Y . . . d field is used differently in the structure with index of 5. The structure with index of 5 is used in the case of six or more pages when a number of ATs have the same most significant six partial identity bits and among the ATs being paged. The Y . . . d field is used for ATs having the same most significant partial identity bits. For example, suppose six ATs are being paged that have most significant partial identity bits as follows: '000000', '000001', '000010', '000011', '111111', and '111111'. The value of Y . . . d would be set to '111111' and the A . . . F, G . . . L, M . . . R, and S . . . X fields would be have values set to '000000', '000001', '000010', and '000011' (not necessarily in that order). Bit ordering and extraction are performed only on the A . . . F, G . . . L, M . . . R, and S . . . X fields; the Y . . . d field is excluded from the procedure. After extraction of the additional bits based upon ordering of the four fields, the extracted bits are associated with less significant portions of the identities corresponding to the four fields. The extracted bits are not used for the Y . . . d field because the AT is unable to determine how many identities using this field were being paged. For example, suppose seven ATs are being paged that have most significant partial identity bits as follows: '000000', '000001', '000010', '000011', '111111', '111111', and '111111'. The Y . . . d field would be set to '111111', but an AT receiving the quick page message would not know whether six, seven, or any number of ATs are being paged. After the extracted bits are distributed among the identities associated with the A . . . F, G . . . L, M . . . R, and S . . . X fields, the c and f bits are also distributed among the identities associated with the A . . . F, G . . . L, M . . . R, and S . . . X fields. The structure with index of 6 is broken into eight fields, A . . . F, G . . . L, M . . . R, S . . . X, Y . . . c, d, e, and f. This structure is used in a similar manner as the structure with index of 5; the main difference is the 'Y . . . c' field is a five-bit field as opposed to a six-bit 'Y . . . d' field in the structure with index of 5.

The structure with index of 6 is used for cases of six or more pages when a number of ATs being paged have the same most significant five partial identity bits in common. For example, suppose that six ATs are being paged that have most significant partial identity bits as follows: '000000', '100001', '010010', '001011', '111110', and '111111'. The most significant five partial identity bits of '111110' and '111111' are the same, so the Y . . . c field can be set to '11111' to accommodate the two ATs having most significant six partial identity bits of '111110' and '111111'. It should be noted that the structure with index of 5 is not used with this set of pages because the most significant six partial identity bits of all six ATs are different. The structure with index of 6 can be used to page seven ATs if three of the ATs have the same most significant 5 partial identity bits. It should be noted that for a set of pages such as '000000', '000001', '000010', '00001', '111111', and '111111' the AT would preferably use the structure with index of 5 rather than the structure with index of 6 because it gives a lower false wakeup probability because partial identity bits are distributed more evenly among the ATs being paged.

For the structure with index of 6, bit ordering and extraction is performed only on the A . . . F, G . . . L, M . . . R, and S . . . X fields; the Y . . . c field is excluded from the procedure. After bit ordering and extraction, the bits in the d e and f fields are similarly distributed among the A . . . F, G . . . L, M . . . R, and S . . . X fields. The structure with index of 7 is broken into five fields, A . . . G, H . . . N, O . . . U, V . . . b, and c . . . f. This structure is used in a similar manner as the structure with index of 6.

The structure with index of 7 is used for cases of six or more pages when a number of ATs being paged have the same most significant four partial identity bits in common. For example, suppose that six ATs are being paged that have most significant partial identity bits as follows: '0000001', '1000010', '0100100', '1111100', and '1111010'. The most significant four partial identity bits of '1111100' and '1111010' are the same, so the c . . . f field can be set to '1111' to accommodate the two ATs having most significant seven partial identity bits of '1111100' and '1111010'. It should be noted that the structures with indexes of 5 and 6 is not used with this set of pages because they require a greater number (than 4) of identical most significant identity bits.

The structure with index of 7 can be used to page seven ATs if three of the ATs have the same most significant 4 partial identity bits. It should be noted that for a set of pages such as '000000', '000001', '000010', '000011', '111111', and '111111' the AT would preferably use the structure with index of 5 rather than the structure with index of 7 because it gives a lower false wakeup probability because partial identity bits are distributed more evenly among the ATs being paged; likewise for a set of pages such as '0000001', '0000010', '0000100', '0000110', '1111110', and '1111100' the AT would preferably use the structure with index of 5 rather than the structure with index of 6. For the structure with index of 7, bit ordering and extraction will be performed only on the A . . . G, H . . . N, O . . . U, V . . . b fields; the c . . . f field is excluded from the procedure.

FIG. 7 shows another group of structures that can be used for quick paging with partial identity comparison. It should be noted that the false wakeup probabilities for the structures with indexes 0 and 1 are very close to zero. In a preferred QPCH structure the ability to switch between partial comparison mode and variable PIs per page is included. Since the false wakeup probabilities using variable PIs per page for 1 and 2 pages are also very close to zero, the difference between partial comparison and variable PIs per page is negligible for 1 and 2 pages. Therefore, these indexes can be eliminated since doing so enables other structures to be included that will give a greater reduction in false wakeup probability for certain cases.

FIG. 7 includes many of the same structures as FIG. 6, but eliminates the ones for 1 and 2 pages in favor of others that give a more substantial benefit. The structures in FIG. 7 with indexes 0, 1, 3, 4, 5, and 7 are the same as the structures in FIG. 6 with indexes 2, 3, 4, 5, 6, and 7, respectively, so their description will not be repeated. The structure with index of 2 in FIG. 7 is used in cases where four or more ATs are being paged and multiple ATs share the most significant eight partial identity bits. The Y . . . f field will be used for multiple ATs sharing the most significant eight partial identity bits. The other fields will be used for the other ATs and bit ordering extraction will be performed with the other fields; any extracted bits are appended to partial identities associated with ATs being paged in the other fields.

The structure with index of 7 is similar to the structure with index of 6. The difference is that the structure with index of 7 has a three-bit field (c . . . e) used for multiple ATs rather than a four-bit field (c . . . f) used for multiple ATs. Using fewer bits for such a field has an advantage in that it will be more likely that a number of pages will have that many bits in common, but the disadvantage is that the false wakeup probability will be higher. It is thought that it would be advantageous to use the structure with index of 7 (when possible due to matching most significant bits) as opposed to 1 PI per page when there are 6 or more pages and only three matching identity bits. It is thought that it would be advantageous to use the structure with index of 7 (when possible due to matching most significant bits) as opposed to variable PIs per page when there are 8 or more pages and only three matching identity bits.

FIG. 8 shows another group of structures that could be used for quick paging with partial identity comparison. They look the same as the structures in FIG. 7. There is a fundamental difference, however. As described with respect to FIG. 7, some of the fields in the FIG. 8 structures can be used to include partial identities of more than one AT. FIG. 8 places a restriction that the fields that are used to page more than one AT be restricted to two ATs only. Although it will not be illustrated with respect to FIG. 8, it would also be possible to have such a field restricted to a larger number of ATs such as three; the index could be used to specify how many ATs are paged in the field used for multiple ATs. Restricting the fields that are used to page more than one AT to a specific number of ATs allows a benefit in reduced false wakeup probability for the structure because it allows for more even distribution of partial identity bits from the quick paging message among the ATs being paged. This even distribution will apply to spare bits such as: e and f, e and f, e and f, d, e, and f, and f from structures with indexes of 0, 3, 4, 5, and 7, respectively. This even distribution will also apply to bits that are extracted from ordering.

Fields Y . . . f from structure of index 2, Y . . . d from structure of index 4, Y . . . c from structure of index 5, c . . . f from structure of index 6, and c . . . e from structure of index 7 are all used to specify most significant partial identity bits of two ATs that are being paged. The structures with indexes 0, 1, 2, 3, 4, 5, 6, and 7 are used to page exactly 3, 4, 5, 5, 6, 6, 6, and 6 ATs, respectively; the same structure cannot be used for different numbers of pages. The use of the structures with indexes 0, 1, and 3 are all used in the same way as in FIG. 7.

For the structure with index of 2, there are 8 partial identity bits allocated to each AT being paged; 8 to the AT paged in A . . . H, 8 to the AT paged in I . . . P, 8 to the AT Paged in Q . . . X, 8 to the first AT being paged in Y . . . f, and 8 to the second AT being paged in Y . . . f. In this case the bits are evenly distributed before allocation of extracted bits. So any extracted bits could be allocated in order to the ATs whose partial identities are used for ordering and bit extraction.

For the structure with index of 4, there are 6 partial identity bits allocated to each AT being paged; 6 to the AT paged in A . . . F, 6 to the AT paged in G . . . L, 6 to the AT paged in M . . . R, 6 to the AT paged in S . . . X, 6 to the first AT being paged in Y . . . d, and 6 to the second AT being paged in Y . . . d. In this case the bits are evenly distributed before allocation of extracted bits. So any extracted bits could be allocated in order to the ATs whose partial identities are used for ordering; if there are five bits extracted, the fifth bit would go to the first AT being paged in Y . . . d, the e bit would go to the second AT being paged in Y . . . d (now all ATs being paged would have the same number of bits) and then the final bit (the f bit) would go to the first AT (i.e. lowest MSBs) whose partial identity is used for ordering.

It should be noted that ATs being paged using Y . . . c of structure 5, c . . . f of structure 6, and c . . . e of structure 7 can all assume one bit of their partial identities based upon a requirement placed on the AN. The AN will only be allowed to page two ATs having the same least significant three bits, but different fourth most significant bits using c . . . e of structure 7; the reason is that if the fourth most significant bits were the same then the c . . . f field of structure 6 would have been used. Similarly the AN will only be allowed to page two ATs having the same least significant four bits, but different fifth most significant bits using c . . . f of structure 6; the reason is that if the fifth most significant bits were the same then the Y . . . c field of structure 5 would have been used. Similarly the AN will only be allowed to page two ATs having the same least significant five bits, but different sixth most significant bits using Y . . . c of structure 5; the reason is that if the fifth most significant bits were the same then the Y . . . d field of structure 4 would have been used. The result of this requirement on the AN is that ATs being paged using c . . . e of structure 7, c . . . f of structure 6, or Y . . . c of structure 5 can assume one bit of these partial identities without it having been transmitted. ATs being paged using c . . . e of structure 7 can make an assumption about the fourth most significant identity bits; ATs being paged using c . . . f of structure 6 can make an assumption about the fifth most significant bit; and ATs being paged using Y . . . c of structure 5 can make an assumption about the sixth most significant bit.

For example, suppose c . . . e of structure 7 is used. It can be assumed that the fourth most significant bit of one of the ATs being paged with c . . . e is 0 and that the fourth most significant bit of the other AT is 0. Those positions can then be assumed in that order when extracted bits are added and when further bits are then added. For the structure with index of 7, there are 7 partial identity bits allocated to the AT paged in A . . . G, 7 to the AT paged in H . . . N, 7 to the AT paged in O . . . U, 7 to the AT paged in V . . . b, 3 to the first AT being paged in c . . . e, and 3 to the second AT being paged in c . . . e. A $4^{th}$ bit of 0 can be implied for the first AT being paged in c . . . e and a $4^{th}$ bit of 1 can be implied for the second AT being paged in c . . . e. Extracted bits are then allocated alternating between the first AT being paged in c . . . e and the second AT being paged in c . . . e. The f bit is then allocated to one of the two, depending on how many extracted bits there were. If all bits are allocated then there will be 7 allocated to each of the six ATs being paged.

For the structure with index of 6, there are 7 partial identity bits allocated to the AT paged in A . . . G, 7 to the AT paged in H . . . N, 7 to the AT paged in O . . . U, 7 to the AT paged in V . . . b, 4 to the first AT being paged in c . . . f, and 4 to the second AT being paged in c . . . f. A $5^{th}$ bit of 0 can be implied for the first AT being paged in c . . . f and a $5^{th}$ bit of 1 can be implied for the second AT being paged in c . . . f. Extracted bits are then allocated alternating between the first AT being paged in c . . . f and the second AT being paged in c . . . f until four have been allocated. Successive bits are allocated among the pages that did not share a field with other pages.

For the structure with index of 5, there are 6 partial identity bits allocated to the AT paged in A . . . F, 6 to the AT paged in G . . . L, 6 to the AT paged in M . . . R, 6 to the AT paged in S . . . X, 5 to the first AT being paged in Y . . . c, and 5 to the second AT being paged in Y . . . c. A $6^{th}$ bit of 0 can be implied for the first AT being paged in Y . . . c and a $6^{th}$ bit of 1 can be implied for the second AT being paged in Y . . . c. At this point six bits have been allocated to each of the pages. At this point, extracted bits plus the d, e, and f bits are then allocated alternating among the various ATs being paged The structure associated with index 4 is handled in much the same manner as the structure associated with index 2 and can be understood from the previous examples.

The structures in FIG. 9 are the same as the ones in FIG. 8, except that structure 2 from FIG. 8 has been deleted and a new one, structure 7 has been added. Structures 3 to 7 from FIG. 8 have been all moved down one index in FIG. 9. The structure associated with index 7 of FIG. 9 is used to page seven ATs. It is used when there are two pairs of mobiles matching at least the most significant three bits of their partial identities.

In the structure associated with index 7, there are 6 partial identity bits allocated to the AT paged in A . . . F, 6 to the AT paged in G . . . L, 6 to the AT paged in M . . . R, 3 to the first AT paged in S . . . U, 3 to the second AT paged in S . . . U, 3 to the first AT being paged in V . . . X, and 3 to the second AT being paged in V . . . X. The bits Y, Z, a, b, c, d, e, and f will then be allocated to the four ATs being paged in S . . . U and V . . . X. The distribution of bits will then be 6, 6, 6, 5, 5, 5, 5, to the ATs paged in A . . . F, G . . . L, M . . . R, S . . . U(first), S . . . U(second), V . . . X(first), and V . . . X(second), respectively. Bits can be extracted via the ordering of the A . . . F, G . . . L, and M . . . R fields as previously described. Furthermore, one bit can also possibly be extracted by the ordering of the two ATs paged in S . . . U and one bit can possibly be extracted by the ordering of the two ATs paged in V . . . X. Extracted bits are added first to the partial identities that have 5 bits until all have 6 bits and are then distributed evenly among all ATs.

Figure 10:
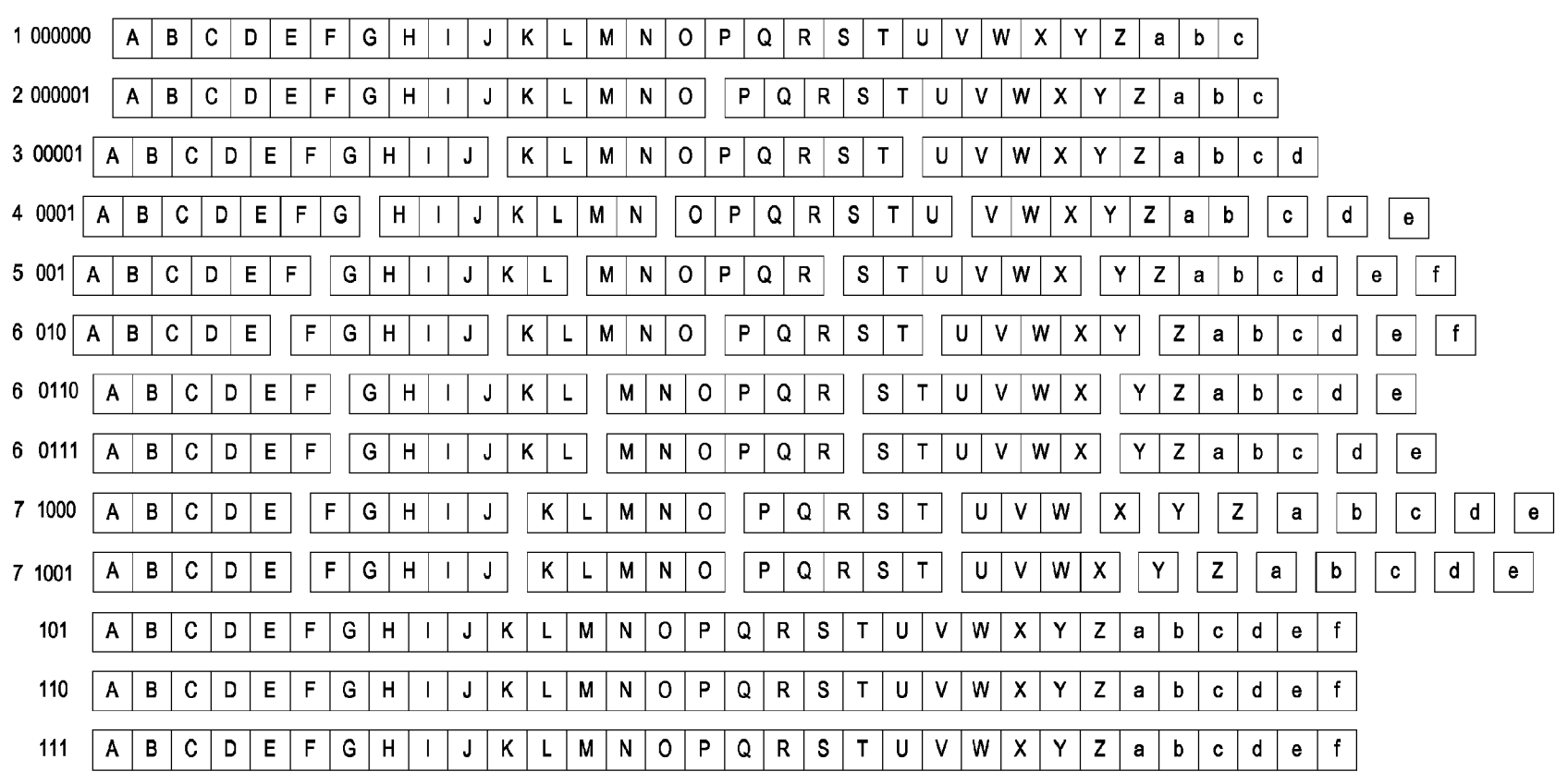

FIG. 10 includes a set of structures that include support for ordering and extraction of extra bits for 2, 3, 4, 5, and 6 pages. In addition, FIG. 10 includes structures that compress a number of partial identity bits from multiple pages into one field where the partial identity bits of the multiple pages match; these structures are used for the case of 6 and 7 pages. FIG. 10 assumes that there are 35 payload bits available in the quick paging message. For each of the possible structures a number of the 35 bits is used to specify which structure is being used The values of these identifying bits are shown in binary form on the left side of each of the structures. To the left of the identifying bits is a number representing a number of pages and is shown when a particular structure is used for a fixed number of pages. The structure with identifying bits '000000' is used to page 1 AT and contains 29 partial identity bits shown in the field A . . . c. The structure with identifying bits '000001' is used to page 2 ATs and contains two fields, A . . . O (15 bits) and P . . . C (14) bits; A . . . O contains partial identity bits associated with a first AT and P . . . C contains partial identity bits associated with a second AT.

Ordering and bit extraction is performed on the two fields in order to convey up to one additional partial identity bit in addition to the 29 partial identity bits in the A . . . c bits of the message structure. The structure with identifying bits '00001' is used to page 3 ATs and contains three 10-bit fields, A . . . J, K . . . T, U . . . d; each of these three fields contains partial identity bits associated with a different AT that is being paged.

Ordering and bit extraction is performed on the three fields in order to convey additional partial identity bits in addition to the 30 partial identity bits in the A . . . d bits in the message structure. The structure with identifying bits '0001' is used to page 4 ATs and contains four 7-bit fields, A . . . G, H . . . N, O . . . U, V . . . b; each of these four fields contains partial identity bits associated with a different AT that is being paged. In addition, there are extra partial identity bits c, d, and e that are also used to specify less significant partial identity bits than in the A . . . G, H . . . N, O . . . U, V . . . b fields.

Ordering and bit extraction is performed on the A . . . G, H . . . N, O . . . U, and V . . . b fields in order to convey additional partial identity bits in addition to the 31 partial identity bits in the A . . . d bits in the message structure.

When the AT receives a quick page message containing this structure, it will sort the values received in the A . . . G, H . . . N, O . . . U, and V . . . b fields; it could sort in ascending order, for example. The AT will consider the lowest value the first partial identity, the second lowest value the second partial identity, the third lowest value the third partial identity, and the highest value the fourth partial identity. Values could also be equal as long as they are sorted. Although ascending order is described, descending order is another possibility. After sorting, the AT will append the extra partial identity bits and the extracted partial identity bits to the first, second, third, and fourth partial identities; either the extra partial identity bits could be appended first or the extracted partial identity bits could be appended first. Since it is imagined that an AT could potentially extract fewer than all of the bits that have been conveyed by ordering, the AT will preferably append the extra partial identity bits first.

The AT will first append the c bit to the current least significant bit of the first partial identity. The AT will then append the d bit to the current least significant bit of the second partial identity. The AT will then append the e bit to the current least significant bit of the third partial identity. The AT will then append the first extracted bit to the current least significant bit of the fourth partial identity. The AT will then append the second extracted bit to the current least significant bit of the first partial identity. The AT will then append the third extracted bit to the current least significant bit of the second partial identity. The AT will then append the fourth extracted bit to the current least significant bit of the third partial identity. If there is a fifth extracted bit, the AT will then append it to the current least significant bit of the fourth partial identity. Extra and extracted bits are appended to the bits of the A . . . G, H . . . N, O . . . U, and V . . . b fields in such a way that the number of partial identity bits for each of the four partial identities is substantially equal.

After appending all of the bits, an AT receiving the quick page message will compare the first, second, third, and fourth partial identities to the corresponding bits of its own identity. If there is a match, the AT will monitor for a regular page; if there is not a match, the AT will be able to go to sleep and not monitor for a regular page, thus reducing power consumption. The sorting and reassembly of the partial addresses at the AT has been described; a similar procedure is used at the AN to determine the value of the extra bits and the values of the extra conveyed bits. In order to do this, the AN would first sort the identities of the ATs being paged. The AN will consider the lowest value the first identity, the second lowest value the second identity, the third lowest value the third identity, and the highest value the fourth identity. The AN will then determine the values of the A . . . G, H . . . N, O . . . U, and V . . . b fields by taking the seven most significant bits of each of the identities. The AN will then determine the values of the extra bits by taking next most significant bits of the identities. The c bit will be set to the eighth most significant bit of the first identity. The d bit will be set to the eighth most significant bit of the second identity. The e bit will be set to the eighth most significant bit of the third identity.

The AN will analyze the numbers of identities that have the same seven most significant bits and determine the number of additional bits that will be added by ordering. The AN will then order the identities and place the most significant seven bits of each of them accordingly in the proper field of the A . . . G, H . . . N, O . . . U, and V . . . b fields based upon the ordering.

The structure with identifying bits '001' is used to page 5 ATs and contains five 6-bit fields containing partial identity bits associated with ATs that are being paged. There are also extra bits e and f. Use of this structure is similar to the structure used to page 4 ATs, but there are five partial identities.

The structure with identifying bits '010' is used to page 6 ATs and contains six 5-bit fields containing partial identity bits associated with ATs that are being paged. There are also extra bits e and f. Use of this structure is similar to the structure used to page 4 ATs, but there are six partial identities.

The structure with identifying bits '010' is used to page 6 ATs and contains six 5-bit fields containing partial identity bits associated with ATs that are being paged. There are also extra bits e and f. Use of this structure is similar to the structure used to page 4 ATs, but there are six partial identities. This structure is used only if there are no two ATs being paged that have the same most significant five partial identity bits.

The structure with identifying bits '0110' is also used to page 6 ATs and contains five 6-bit fields A . . . F, G . . . L, M . . . R, and S . . . X, each containing six most significant partial identity bits associated with ATs that are being paged. This structure also includes an extra bit e. This structure also includes one 6-bit field, Y . . . d that contains the six most significant partial identity bits of two ATs that are being paged. The AN preferably uses this structure rather than the '010' structure when there are two ATs being paged that have six or more most significant partial identity bits in common. These two ATs will be represented by the Y . . . d field. Ordering and extraction of additional partial identity bits is performed using the A . . . F, G . . . L, M . . . R, and S . . . X fields. When an AT performs ordering and bit extraction and adds extra bits, it will be similar to the way described in the '0001' structure, but the AT will copy the Y . . . d field for both the fifth and sixth partial identities and will append extra and extracted bits separately for the fifth and sixth partial identities in such a way as to have all ATs being paged have a substantially equal number of partial identity bits at the end of the process.

The structure with identifying bits '0111' is also used to page 6 ATs. It is similar to the '0110' structure and the only differences from the '0110' structure is that the Y . . . c field used to page two ATs has one fewer bit and there are two extra bits, d and e. The structure with identifying bits '0111' is used if there are exactly 5 MSBs of two of the partial identities of the six ATs matching.

The structure with identifying bits '1000' is used to page 7 ATs and contains four 5-bit fields A . . . E, F . . . J, K . . . O, and P . . . T, each containing five most significant partial identity bits associated with ATs that are being paged. This structure also includes an extra bits X, Y, Z, a, b, c, d, and e. This structure also includes one 3-bit field, U . . . W that contains the three most significant partial identity bits of three ATs that are being paged. The AN uses this structure when there are three ATs being paged having exactly three most significant partial identity bits in common. These three ATs will be represented by the U . . . W field. Ordering and extraction of additional partial identity bits is performed using the A . . . E, F . . . J, K . . . O, and P . . . T fields. When an AT performs ordering and bit extraction and adds extra bits, it will be similar to the way described in the '0001' structure, but the AT will copy the U . . . W field for both the fifth, sixth and seventh partial identities and will append extra and extracted bits first for the fifth, sixth, and seventh partial identities such that these three partial identities all have five bits before appending to the other partial identities. Ordering and bit extraction can then occur a second time on the partial identities now specified by the U . . . W fields. These extracted bits will then be distributed in such a way as to have all ATs being paged have a substantially equal number of partial identity bits at the end of the process.

The structure with identifying bits '1001' is also used to page 7 ATs. It is similar to the '1000' structure and the only differences from the '1000' structure is that the U . . . X field used to page three ATs has one more bit and there are extra bits Y, Z, a, b, c, d, and e. The structure with identifying bits '1001' is used if there are 4 or more MSBs of three of the partial identities of the seven ATs matching. The structure with identifying bits '101' is used for paging 7 or more ATs with three paging indicators per page. The remaining 32 bits A . . . f are used to send the paging indicators. The structure with identifying bits '110' is used for paging 7 or more ATs with two paging indicators per page. The remaining 32 bits A . . . f are used to send the paging indicators. The structure with identifying bits '111' is used for paging 7 or more ATs with one paging indicator per page. The remaining 32 bits A . . . f are used to send the paging indicators. When paging 7 or more ATs, the AN will choose between the structures '101', '110', and '111' based upon which will provide the lowest false wakeup probability for ATs.

FIG. 11 will be used to describe how the structure '0001' of FIG. 10 is used to page four ATs. When the AN has four pages to send in the quick page message, it will sort them in ascending order based upon the seven MSBs of the corresponding partial identities. The page having the lowest value for the seven MSBs will be the first page; the page having the second lowest value for the seven MSBs will be the second page; the page having the third lowest value for the seven MSBs will be the third page; the page having the highest value for the seven MSBs will be the fourth page. The AN will then determine extra bits c, d, and e based upon the sorted partial identities. Extra bit c will correspond to the $8^{th}$ most significant bit of the first partial identity. Extra bit d will correspond to the $8^{th}$ most significant bit of the second partial identity. Extra bit e will correspond to the $8^{th}$ most significant bit of the third partial identity. The AN will then determine the number of bits that can be conveyed via ordering based upon the values of the 7 MSBs of the identities associated with the paged ATs—it will depend upon the number of equal values for the 7 MSBs; for the purpose of discussion, it will be assumed that 5 bits will be conveyed. Bits j, k, l, m, and n will be conveyed via the ordering of the four partial identities in the structure. Bit j corresponds to the $8^{th}$ MSB of the fourth partial identity. Bit k corresponds to the $9^{th}$ MSB of the first partial identity. Bit l corresponds to the $9^{th}$ MSB of the second partial identity. Bit m corresponds to the $9^{th}$ MSB of the third partial identity. Bit n corresponds to the $9^{th}$ MSB of the fourth partial identity. It should be noted that five partial identities will not always be conveyed; it will depend upon the values of the identities associated with the ATs being paged. Based upon the values of bits j, k, l, m, and n of the identities associated with the ATs being paged, the AN will determine the order of the pages. For the purpose of discussion, assume that the AN swaps the third and fourth partial identities in order to convey the values of j, k, l, m, and n. The bits A . . . e in FIG. 11 correspond to the A . . . e bits in structure '0001' in FIG. 10 and will be filled in correspondingly. Upon receiving the quick page message, an AT will process the fields as follows. The AT will receive the fields of structure '0001', the AT will sort the A . . . G, H . . . N, O . . . U, and V . . . b fields and place them in an appropriate data structure in the AT. FIG. 11 shows them in ascending order, top to bottom. The AT will then append extra bits c, d, and e to the sorted partial identities starting with next most significant bits of the first, second, and third partial identities, respectively, as shown in FIG. 11. The AT will determine the extracted bits j, k, l, m, and n based upon the relative ordering in structure '0001' compared to the sorted ordering. The AT will then append extracted bits j, k, l, m, and n to as the next most significant bits of the fourth partial identity, first partial identity, second partial identity, third partial identity, and fourth partial identity, respectively. The AT will then perform partial identity comparison on these four identities shown in FIG. 11.

FIG. 12 will be used to describe how the structure '0110' of FIG. 10 is used to page six ATs. As can be seen from the description of FIG. 11, AN operation is analogous to AT operation, so only the AT operation will be described. Upon receiving the quick page message, an AT will process the fields as follows. The AT will receive the fields of structure '0110' and the AT will sort the A . . . F, G . . . L, M . . . R, and S . . . X fields and place them in an appropriate data structure in the AT as shown in FIG. 12. FIG. 12 shows them in ascending order, top to bottom. For the purpose of discussion, it will be assumed that the AN has swapped the third and fourth partial identities in order to convey additional bits. The AT will then copy the Y . . . d field into both the fifth and sixth partial identity locations in the data structure. The AT will then place the extra bit e as the next most significant bit of the first partial identity. The AT will determine the extracted bits based upon the relative ordering in structure '0110' compared to the sorted ordering. The AT will then place the extracted bits j, k, l, m, n (as many as are received) into next most significant bit positions for successive identities. The AT will then perform partial identity comparison on these six identities shown in FIG. 12.

FIG. 13 will be used to describe how the structure '01111' of FIG. 10 is used to page six ATs. As can be seen from the description of FIG. 11, AN operation is analogous to AT operation, so only the AT operation will be described. Upon receiving the quick page message, an AT will process the fields as follows. The AT will receive the fields of structure '0111' and the AT will sort the A . . . F, G . . . L, M . . . R, and S . . . X fields and place them in an appropriate data structure in the AT as shown in FIG. 13. FIG. 13 shows them in ascending order, top to bottom. For the purpose of discussion, it will be assumed that the AN has swapped the third and fourth partial identities in order to convey additional bits. The AT will then copy the Y . . . c field into both the fifth and sixth partial identity locations in the data structure. The AT will then place the extra bit d as the next most significant bit of the fifth partial identity. The AT will then place the extra bit e as the next most significant bit of the sixth partial identity. Bit placement of the d and e extra bits is as such because previously the bits were unevenly allocated among the partial identities and it is desirable to allocate bits among the partial identities substantially equally. The AT will determine the extracted bits based upon the relative ordering in structure '0111' compared to the sorted ordering. The AT will then place the extracted bits j, k, l, m, n (as many as are received) into next most significant bit positions for successive identities as shown in FIG. 13. The AT will then perform partial identity comparison on these six identities shown in FIG. 13.

FIG. 14 will be used to describe how the structure '1000' of FIG. 10 is used to page seven ATs. As can be seen from the description of FIG. 11, AN operation is analogous to AT operation, so only the AT operation will be described. Upon receiving the quick page message, an AT will process the fields as follows. The AT will receive the fields of structure '1000' and the AT will sort the A . . . E, F . . . J, K . . . O, and P . . . T fields and place them in an appropriate data structure in the AT as shown in FIG. 14. FIG. 14 shows them in ascending order, top to bottom. For the purpose of discussion, it will be assumed that the AN has swapped the third and fourth partial identities in order to convey additional bits. The AT will then copy the U . . . W field into the fifth, sixth, and seventh partial identity locations in the data structure. The AT will then place the extra bits X, Y, Z, a, b, c, d, and e as the next most significant bits of the fifth, sixth, and seventh partial identities as shown in FIG. 14. The AT will determine the extracted bits j, k, l, m, n (as many as are received) based upon the relative ordering of the A . . . E, F . . . J, K . . . O, and P . . . T fields in structure '1000' compared to the sorted ordering. The AT will the place the extracted bit j in the next most significant bit position of the seventh partial identity as shown in FIG. 14. Placement of the bits X, Y, Z, a, b, c, d, e, and j in the fifth, sixth, and seventh positions is as such in order to maximize the ordering benefit of the fifth, sixth, and seventh partial identities; i.e. adding next most significant bits to these partial identities first will maximize the number of bits that can be conveyed and extracted via the ordering of these three partial identities. Subsequent partial identities k, l, m, and n (as many as have been extracted) will then be added to the first, second, third, and fourth partial identities as shown in order to equalize the distribution of bits to the various partial identities. Having now determined the six MSBs of the fifth, sixth, and seventh partial identities the AT will then perform bit extraction by sorting the values of the fifth, sixth, and seventh partial identities and comparing the received order to the sorted order in an analogous way to the extraction of the bits from the ordering of the first four partial identities. Bits x, y, and z are then appended to subsequent MSBs as shown in FIG. 14. For the purpose of illustration, assume that only bits j, k, l, and m (but not n) were extracted from the ordering of the first four partial identities; if this were the case, x would have been distributed where n is shown, y where x is shown, and z where y is shown. The AT will then perform partial identity comparison on these six identities shown in FIG. 14.

FIG. 15 will be used to describe how the structure '1001' of FIG. 10 is used to page seven ATs. As can be seen from the description of FIG. 11, AN operation is analogous to AT operation, so only the AT operation will be described. Upon receiving the quick page message, an AT will process the fields as follows. The AT will receive the fields of structure '1001' and the AT will sort the A . . . E, F . . . J, K . . . O, and P . . . T fields and place them in an appropriate data structure in the AT as shown in FIG. 15. FIG. 15 shows them in ascending order, top to bottom. For the purpose of discussion, it will be assumed that the AN has swapped the third and fourth partial identities in order to convey additional bits. The AT will then copy the U . . . X field into the fifth, sixth, and seventh partial identity locations in the data structure. The AT will then place the extra bits Y, Z, a, b, c, d, and e as the next most significant bits of the fifth, sixth, and seventh partial identities as shown in FIG. 15. The AT will determine the extracted bits j, k, l, m, n (as many as are received) based upon the relative ordering of the A . . . E, F . . . J, K . . . O, and P . . . T fields in structure '1001' compared to the sorted ordering. The AT will the place the extracted bit j in the next most significant bit position of the sixth partial identity as shown in FIG. 15. The AT will the place the extracted bit k in the next most significant bit position of the seventh partial identity as shown in FIG. 15. Placement of the bits Y, Z, a, b, c, d, e, j, and k in the fifth, sixth, and seventh positions is as such in order to maximize the ordering benefit of the fifth, sixth, and seventh partial identities; i.e. adding next most significant bits to these partial identities first will maximize the number of bits that can be conveyed and extracted via the ordering of these three partial identities. Subsequent partial identities l, m, and n (as many as have been extracted) will then be added to the first, second, third, and fourth partial identities as shown in order to equalize the distribution of bits to the various partial identities. Having now determined the seven MSBs of the fifth, sixth, and seventh partial identities the AT will then perform bit extraction by sorting the values of the fifth, sixth, and seventh partial identities and comparing the received order to the sorted order in an analogous way to the extraction of the bits from the ordering of the first four partial identities. Bits x, y, and z (as many as are extracted) are then appended to subsequent MSBs as shown in FIG. 15 in such a way as to equalize the distribution of bits among the partial identities of the seven ATs. The AT will then perform partial identity comparison on these six identities shown in FIG. 15. It should be noted that in some extreme cases there may be low numbers of extracted bits; for example, suppose the AN determines that the six MSBs of all of the seven ATs match. In such cases the structure '1000' will provide no benefit over using Paging Indicators. In such cases the AN can use paging indicators instead of the structure '1000' if it determines that paging indicators would give a lower false wakeup probability.

FIG. 16 will be used to describe an alternative way that the structure '1001' of FIG. 10 could be used to page seven ATs. As can be seen from the description of FIG. 11, AN operation is analogous to AT operation, so only the AT operation will be described. Upon receiving the quick page message, an AT will process the fields as follows. The AT will receive the fields of structure '1001' and the AT will sort the A . . . E, F . . . J, K . . . O, and P . . . T fields and place them in an appropriate data structure in the AT as shown in FIG. 15. FIG. 16 shows them in ascending order, top to bottom. For the purpose of discussion, it will be assumed that the AN has swapped the third and fourth partial identities in order to convey additional bits. The AT will then copy the U . . . X field into the fifth, sixth, and seventh partial identity locations in the data structure. The AT will then place the extra bits Y, Z, a, b, c, and d as the next most significant bits of the fifth, sixth, and seventh partial identities as shown in FIG. 16. The AT will place extra bit e in the next most significant bit position of the first partial identity. The AT will determine the extracted bits j, k, l, m, n (as many as are received) based upon the relative ordering of the A . . . E, F . . . J, K . . . O, and P . . . T fields in structure '1001' compared to the sorted ordering. The AT will the place the extracted bit j in the next most significant bit position of the second partial identity as shown in FIG. 15. The AT will the place the extracted bit k in the next most significant bit position of the third partial identity as shown in FIG. 16. Subsequent partial identities l, m, and n (as many as have been extracted) will then be added as shown in order to equalize the distribution of bits to the various partial identities. Having now determined the six MSBs of the fifth, sixth, and seventh partial identities the AT will then perform bit extraction by sorting the values of the fifth, sixth, and seventh partial identities and comparing the received order to the sorted order in an analogous way to the extraction of the bits from the ordering of the first four partial identities. Bits x, y, and z (as many as are extracted) are then appended to subsequent MSBs as shown in FIG. 15 in such a way as to equalize the distribution of bits among the partial identities of the seven ATs. The AT will then perform partial identity comparison on these six identities shown in FIG. 15. It should be noted that in some extreme cases there may be low numbers of extracted bits; for example, suppose the AN determines that the six MSBs of all of the seven ATs match. In such cases the structure '1000' will provide no benefit over using Paging Indicators. In such cases the AN can use paging indicators instead of the structure '1000' if it determines that paging indicators would give a lower false wakeup probability.

The previous descriptions are of preferred examples for implementing the invention, and the scope of the invention should not necessarily be limited by this description. The scope of the present invention is defined by the following claims.

What is claimed:

1. A method of facilitating access terminal paging, said method comprising:

ordering a first group of partial identities that includes at least a first partial identity and a second partial identity, wherein a value of a first additional identity bit can be determined based upon an order of the first partial identity and the second partial identity in an access terminal paging message without the first additional identity bit being included in the access terminal paging message; and structuring the access terminal paging message to include the first group of partial identities, ordered by said ordering, and a second group of partial identities, the second group of partial identities including at least a third partial identity, wherein the order of the first group of partial identities conveys the value of the first additional identity bit.

2. The method of claim 1 wherein the first group of partial identities further includes a fourth partial identity, and wherein said ordering further comprises ordering the fourth partial identity.

3. The method of claim 2 wherein ordering of the first group is further determinative of a value of a second additional identity bit.

4. The method of claim 1 wherein the second group of partial identities further includes a fourth partial identity and wherein the ordering of the third partial identity and the fourth partial identity determinative of a value of a second additional identity bit.

5. The method of claim 1 wherein the access terminal paging message is further structured to include a common portion that is common to portions of at least two partial identities.

6. The method of claim 5 wherein the common portion is common to the first partial identity and to the second partial identity.

7. The method of claim 6 wherein the common portion is further common to the third partial identity.

8. The method of claim 5 wherein the common portion is common to the first partial identity and to the third partial identity.

9. Apparatus for facilitating access terminal paging, said apparatus comprising:

an orderer configured to order a first group of partial identities that includes at least a first partial identity and a second partial identity, wherein a value of a first additional identity bit can be determined based upon an order of the first partial identity and the second partial identity in an access terminal paging message without the first additional identity bit being included in the access terminal paging message; and a structurer configured to structure the access terminal paging message to include the first group of partial identities, a second group of partial identities including at least a third partial identity, wherein said order of the first partial identity and the second partial identity conveys the value of the first additional identity bit.

10. The apparatus of claim 9 wherein the first group further comprises at least a fourth partial identity and wherein said orderer is further configured to order the fourth partial identity.

11. The apparatus of claim 10 wherein the ordering of the first partial identity, the second partial identity and the fourth partial identity is further determinative of a value of a second additional identity bit.

12. The apparatus of claim 9 wherein the second group of partial identities further comprises at least a fourth partial identity and wherein said orderer is further configured to order the second group, the ordering of the third partial identity and the fourth partial identity being determinative of a value of a second additional identity bit.

13. The apparatus of claim 9 wherein said structurer is further configured to include a common portion that is common to at least two partial identities.

14. A method for facilitating paging of an access terminal, said method comprising:
 detecting delivery at the access terminal of a paging message structured to include an access terminal paging message to include a first group of partial identities and a second group of partial identities, the first group including at least a first partial identity and a second partial identity in an ordered arrangement, and the second group including at least a third partial identity, wherein a value of a first additional identity bit can be determined based upon an order of the first partial identity and the second partial identity in the access terminal paging message without the first additional identity bit being included in the access terminal paging message;
 determining the value of the first additional identity bit based upon the order of the first group of partial identities; and
 deciding whether the access terminal is paged.

15. The method of claim 14 wherein the first group of identities further comprises at least a fourth partial identity and wherein ordering of the first partial identity, the second partial identity, and the fourth partial identity is further determinative of a value of a second additional identity bit.

16. The method of claim 14 wherein deciding further comprises utilizing a common portion of at least two partial identities.

17. Apparatus for facilitating paging of an access terminal, said apparatus comprising:
 a detector configured to detect delivery at an access terminal of an access terminal paging message structured to include a first group of partial identities and a second group of partial identities, the first group including at least a first partial identity and a a second partial identity in an ordered arrangement, and the second group including at least a third partial identity, wherein a value of a first additional identity bit can be determined based upon an order of the first partial identity and the second partial identity in the access terminal paging message without the first additional identity bit being included in the access terminal paging message;
 a determiner configured to determine the value of the first additional identity bit based upon the order of the first group of partial identities; and
 a decider configured to decide whether the access terminal is paged.

18. The apparatus of claim 17 wherein said decider is further configured to utilize a common portion of at least two partial identities.

* * * * *